(12) United States Patent
Kiss et al.

(10) Patent No.: US 10,140,581 B1
(45) Date of Patent: Nov. 27, 2018

(54) CONDITIONAL RANDOM FIELD MODEL COMPRESSION

(71) Applicant: Amazon Technologies, Inc., Seattle, WA (US)

(72) Inventors: Imre Attila Kiss, Arlington, MA (US); Wei Chen, Cambridge, MA (US); Anjishnu Kumar, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 716 days.

(21) Appl. No.: 14/580,059

(22) Filed: Dec. 22, 2014

(51) Int. Cl.
*G06N 99/00* (2010.01)
*G06N 7/00* (2006.01)

(52) U.S. Cl.
CPC .............. *G06N 99/005* (2013.01); *G06N 7/00* (2013.01)

(58) Field of Classification Search
CPC ........ G06N 99/005; G06F 17/27; G06F 17/22
See application file for complete search history.

(56) References Cited

U.S. PATENT DOCUMENTS

| 6,009,390 | A  | * | 12/1999 | Gupta ................... | G10L 15/144 704/240 |
|---|---|---|---|---|---|
| 9,658,999 | B2 | * | 5/2017 | Bohnet ................ | G06F 17/2705 |
| 9,684,650 | B2 | * | 6/2017 | Nelakanti ............... | G06F 17/28 |
| 2011/0173000 | A1 | * | 7/2011 | Yamamoto .......... | G10L 15/1815 704/240 |

OTHER PUBLICATIONS

Dinarelli, M., & Rosset, S. (Nov. 2011). Models Cascade for Tree-Structured Named Entity Detection. In IJCNLP (pp. 1269-1278).*
Gross, S. S., Russakovsky, O., Do, C. B., & Batzoglou, S. (2007). Training conditional random fields for maximum labelwise accuracy. In Advances in Neural Information Processing Systems (pp. 529-536).*
Liu, Y., Stolcke, A., Shriberg, E., & Harper, M. (Jun. 2005). Using conditional random fields for sentence boundary detection in speech. In Proceedings of the 43rd Annual Meeting on Association for Computational Linguistics (pp. 451-458). Association for Computational Linguistics. (Year: 2005).*
Sutton, C., & McCallum, A. (2012). An introduction to conditional random fields. Foundations and Trends® in Machine Learning, 4(4), 267-373. (Year: 2012).*

* cited by examiner

*Primary Examiner* — Alexey Shmatov
*Assistant Examiner* — Oluwatosin Alabi
(74) *Attorney, Agent, or Firm* — Knobbe, Martens, Olson & Bear, LLP (57) ABSTRACT

Features are disclosed for generating models, such as conditional random field ("CRF") models, that consume less storage space and/or transmission bandwidth than conventional models. In some embodiments, the generated CRF models are composed of fewer or alternate components in comparison with conventional CRF models. For example, a system generating such CRF models may forgo the use of large dictionaries or other cross-reference lists that map information extracted from input (e.g., "features") to model parameters; reduce in weight (or exclude altogether) certain model parameters that may not have a significant effect on model accuracy; and/or reduce the numerical precision of model parameters.

18 Claims, 5 Drawing Sheets

CONDITIONAL RANDOM FIELD MODEL COMPRESSION

BACKGROUND

Computing devices can use models representing data relationships and patterns, such as functions, algorithms, systems, and the like, to process input and produce output that corresponds to the input in some way. In some implementations, a statistical model is used to generate a probability or likelihood that the input corresponds to a particular label, value, or the like. For example, computing tasks such as automatic speech recognition ("ASR") and natural language understanding ("NLU") use various statistical models to determine the probability that input, such as audio input of a user utterance or textual input generated from such audio input, corresponds to a particular word, sentence, actionable command, or some other type of information.

Conditional random fields ("CRFs") are statistical models widely used in NLU applications, such as named entity recognition ("NER") in which words and phrases are labeled as particular entities (e.g., people, places, organizations, etc.). CRFs typically include a set of states and a set of corresponding parameter weights. When used for NER, the states of a CRF model represent the possible entity labels that may be applied to the input. The parameter weights correspond to information extracted from the input, known as "features" or "feature vectors." In some cases, a CRF model may include hundreds of thousands or even millions of weights. In order to reduce the size of large CRF models for storage or network transmission, the components of the CRFs can be compressed using various techniques, such as Lempel-Ziv coding ("gzip") or Burrows-Wheeler transform coding ("bzip").

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to generating conditional random field ("CRF") models that are composed of fewer components and parameters than conventional CRF models, and therefore consume less storage space and/or transmission bandwidth than conventional CRF models. In some embodiments, a combination of methods may be used to reduce the size of the CRF models, such as: forgoing the use of large dictionaries or other cross-reference lists that map information extracted from input (e.g., "features") to model parameters; reducing in weight (or excluding altogether) certain model parameters that may not have a significant effect on model accuracy; and reducing the numerical precision of model parameters. A CRF model generated via such methods may be substantially smaller than conventional CRF models without a corresponding loss of accuracy, speed, and other measurements of model accuracy.

Conventional CRF models, such as those used in named entity recognition ("NER"), include input dictionaries mapping feature names to feature indices, and the feature indices are used to locate parameter values in the model. Such CRF models also include output dictionaries mapping model state indices to named entity labels (e.g., a word or phrase may be labeled as a particular category, useful in determining the meaning of a sentence, such as a "person," "place," "organization," "artist," "song title," etc.). In addition, CRF models include parameter values for every feature in every state of the models, and transition weights reflecting the probability that individual states directly follow each other in sequence. The size of conventional CRF models can vary from a few megabytes to a few hundred megabytes (or even gigabytes) depending on the training data used to train the model, the binary representation chosen for the model, and other factors. In general, the size of CRF models is primarily based on the size of the input dictionary and the number of parameter values. For example, 90% of the size of a CRF model generated using conventional techniques may be attributable to the input dictionary and parameter values. Compression techniques such as Lempel-Ziv coding ("gzip") or Burrows-Wheeler transform coding ("bzip") may reduce the size of the model, but the resulting compressed model is typically not usable unless it is decompressed. Thus, the model may continue to have significant memory requirements during use.

Some aspects of the present disclosure relate to reducing or eliminating the input dictionary of a CRF model, and instead using a function to generate or determine the location of model parameters for individual input features. In some embodiments, a hash function that maps a large or unlimited number of different inputs to a fixed number of outputs may be used in place of an input dictionary. A system using a CRF model implementing such a hash function may extract features from input and, rather than look up indices to corresponding model parameters for the extracted features, the system may use the hash function to compute a hash of the feature. The output of the hash function may be used as the index or location of the model parameter values corresponding to the particular feature. In order to reduce the potentially adverse effects of hash collisions (e.g., mapping two or more different inputs to the same output value), the model parameter values for individual features may be stored at multiple locations in the model (e.g., there may be two or more copies of the model parameter values for a given feature). Thus, two different hash functions may be used to locate parameter values for a given input, or the input may be hashed twice using the same hashing function. For example, the input may be hashed to obtain a first value corresponding to a first location in the model. The input may then be modified in some way and hashed again to obtain a second value corresponding to a second location in the model. By replacing the input dictionary with one or more hashing functions, the resulting CRF model may consume substantially less space, both in persistent storage and during use in volatile memory.

Additional aspects of the present disclosure relate to reducing the weight given to model parameters contributing little (or nothing at all) to the accuracy of the model, or eliminating such parameters from the model altogether. For example, a process known as regularization may be used. As used herein, the term "regularization" generally refers to the process of constraining model parameters to reduce the effect that certain model parameters may have on output generated using the model. In some embodiments, regularization may urge values of unimportant model parameters to zero so that the parameters can be eliminated from model. In some embodiments, a substantial portion of model parameters may contribute little (or not contribute at all) to the accuracy of the model, and may be eliminated from the model. Accordingly, the amount of storage space consumed by the model parameters may also be reduced substantially (e.g., by about 50%, about 67%, about 75%, about 90%, or more). The effect of regularization may be particularly beneficial when combined with quantization of model parameter values.

Further aspects of the present disclosure relate to reducing the numerical precision of model parameter values. By representing model parameter values with less precision than conventional CRF models, the model parameter values can be stored using more efficient data types. In some embodiments, rather than representing model each parameter value using an 8-byte double precision numerical data type, the model parameters can be represented using a 1-byte numerical data type. Although small differences in the values may be lost when the values are stored in this way, the relative differences in the importance of the values may be maintained. For example, parameters which tend to contribute the most to the accuracy of the model may generally have larger values (whether positive or negative) than parameters that tend to contribute the least to the accuracy of the model (which tend to be closer to zero). In some embodiments, the numerical precision of model parameter values may be reduced using a uniform quantization process in which the range of available values is separated into equal portions, and the same output value is assigned to all input values in a given portion.

Various aspects of the disclosure will now be described with regard to certain examples and embodiments, which are intended to illustrate but not limit the disclosure. Although the examples and embodiments described herein will focus, for the purpose of illustration, on reducing the size of CRF models trained for named entity recognition, one skilled in the art will appreciate that the techniques described herein may be applied to any CRF model. In addition, although the examples and embodiments described herein will focus, for the purpose of illustration, on particular hashing processes, regularization processes, quantization processes and the like, the one skilled in the art will appreciate that the techniques described herein may be applied to various other processes.

Sample Model Training System

Figure 1:
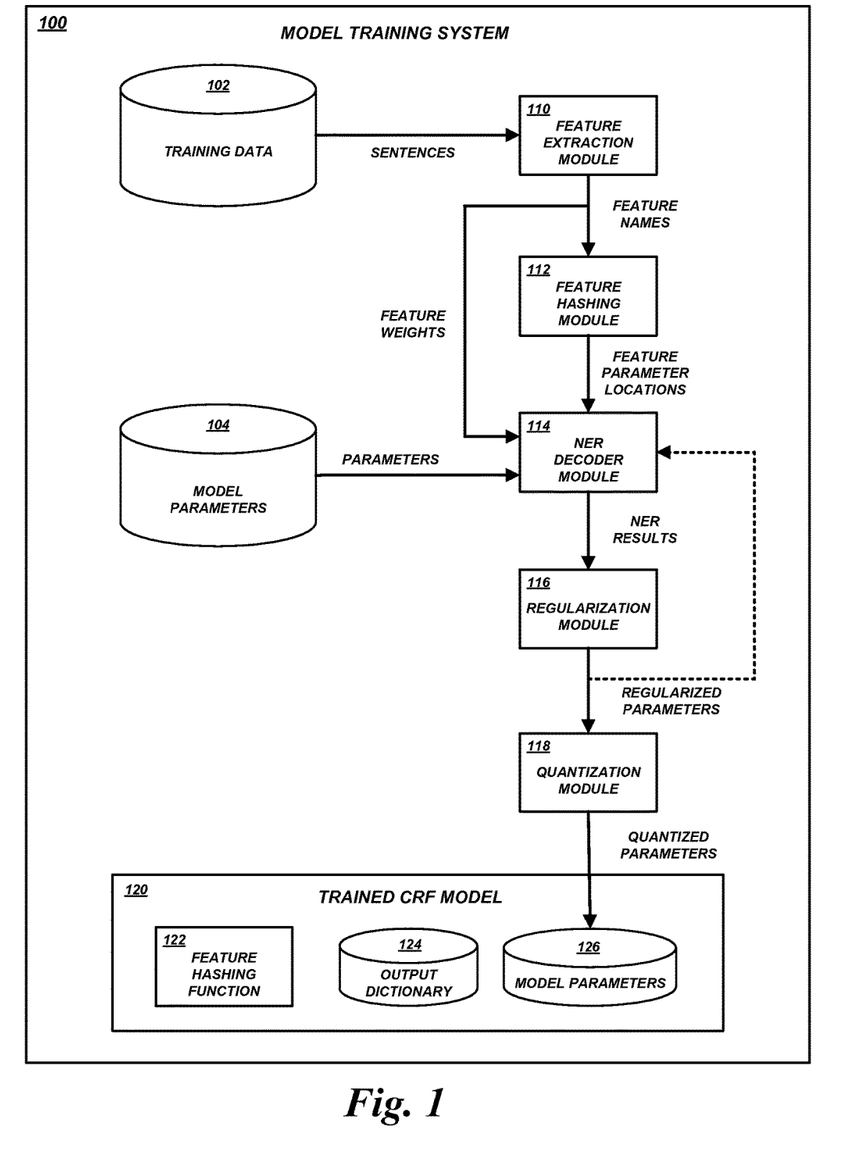
FIG. 1 is a block diagram of an illustrative model training system configured to train conditional random field models according to some embodiments.

With reference to an illustrative embodiment, FIG. 1 depicts a model training system 100 configured to train CRF models such that the amount of storage space, transmission bandwidth, and the like consumed by the models is minimized or reduced with respect to conventional CRF modules. Advantageously, the CRF models produced by the model training system 100 may be generated in a format that may be used directly, rather than a format that requires decompression after retrieval. Thus, CRF models generated by the model training system 100 may also consume less volatile memory and other computing resources during use than conventional CRF models.

As shown, the model training system 100 may include various modules and data stores to facilitate the training features described in greater detail below. The model training system 100 may include a training data store 102 to store previously-generated training data on which to train the CRF model, and an initial model parameters data store 104 to store the model parameters to be trained. The model training system 100 may also include a feature extraction module 110 to extract features names and generate feature weights from the training data, a feature hashing module 112 to hash the feature names extracted from the training data, a named entity recognition decoder module 114 ("NER module") that uses the hashed training data features, the feature weights, and the model parameters to generate NER results, a regularization module 116 to update and regularize the model parameters, and a quantization module 118 to reduce the precision of the model parameters. As shown and described in greater detail below, the parameters may be modified iteratively until some condition is met (e.g., the parameter values converge or change by smaller than a threshold amount). The model training system 100 may produce, as output of the training process, a trained CRF model 120. As described in greater detail below, the trained CRF model 120 may include one or more feature hashing functions 122 in lieu of an input dictionary, an output dictionary 124, and a set of model parameters 126 that may be significantly smaller than the initial model parameters 104.

In some embodiments, the model training system 100 may be a single computing device, such as a server computing device, or it may include multiple distinct computing devices, logically or physically grouped together to collectively operate as a model training system 100. The modules and components of the model training system 100 can each be implemented as hardware or as a combination of hardware and software. In addition, the modules and components of the model training system 100 can be combined on one computing device or separated individually or into groups on several computing devices. In some embodiments, the features and services provided by the model training system 100 may be implemented as web services consumable via a communication network. In further embodiments, the model training system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In one illustrative example, the model training system 100 may be implemented on one or more server computing devices, each server computing device including one or more computer processors, network interfaces, persistent storage components, and computer-readable memories. The memories may include computer program instructions that the computer processors execute in order to implement one or more embodiments. The memories may include volatile memory, such as RAM, and/or other non-transitory computer readable media.

Sample Processes for Training CRF Models

Figure 2:
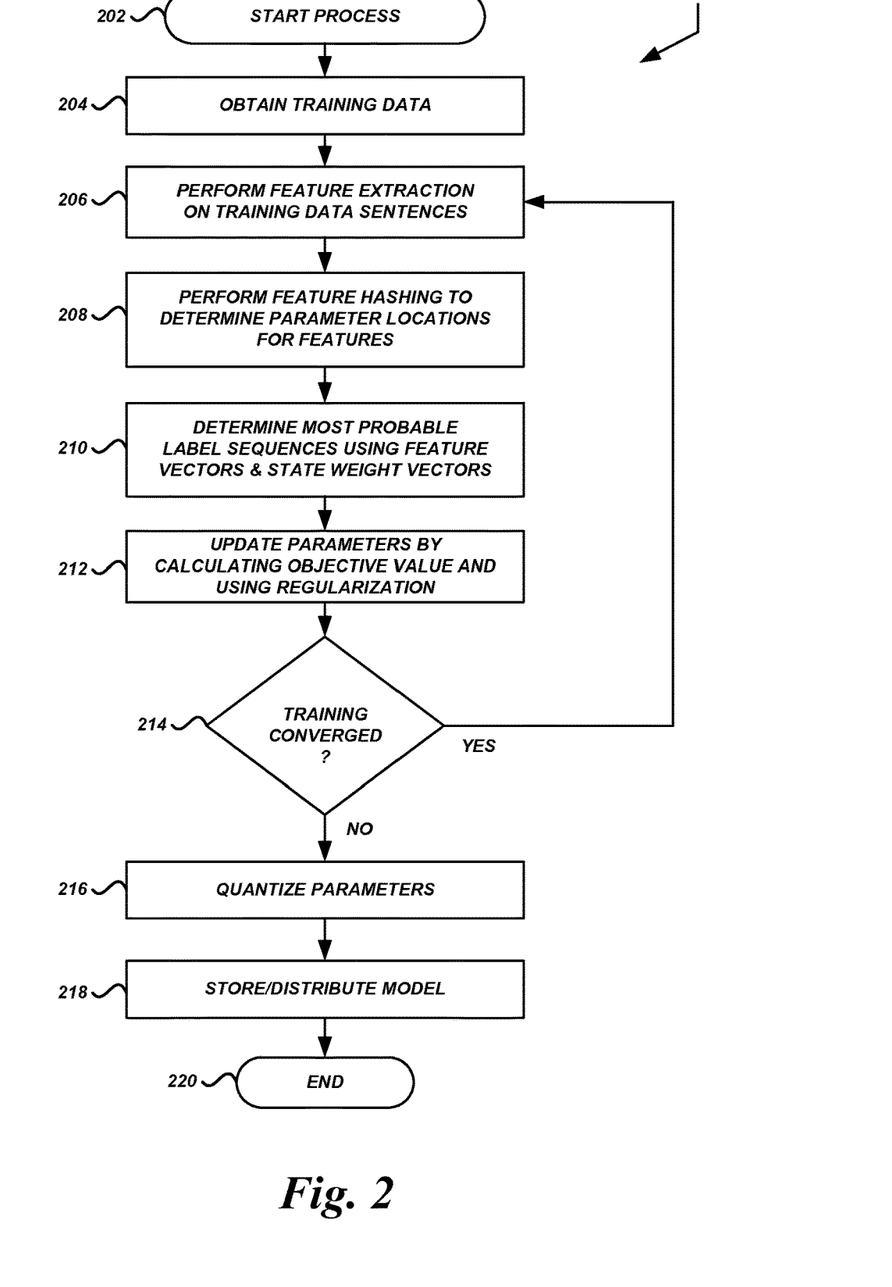
FIG. 2 is a flow diagram of an illustrative process for training conditional random field models according to some embodiments.

FIG. 2 illustrates an example process 200 that the model training system 100 may use to train a CRF model. The process 200 shown in FIG. 2 begins at block 202. The process 200 may be embodied in a set of executable program instructions stored on a computer-readable medium, such as a persistent storage component of a server computing device of the model training system 100. When the process 200 is initiated, the executable program instructions can be loaded into computer-readable memory, such as RAM, and executed by one or more computer processors of the server computing device. In some embodiments, multiple computer processors or server computing devices may execute portions of the process 200 serially or in parallel.

At block 204, the system executing the process 200 can obtain training data. When training a model to perform named entity recognition, training data may include a set of textual sentences. Each word of each sentence (or some subset thereof) may be labeled with the correct entity name (e.g., a particular category useful in determining the meaning of a sentence), or labeled as a non-entity. Thus, the model training system 100 may perform NER on the sentence and compare the results (e.g., a sequence of labels corresponding to the sequence of words in the sentence) to the correct labels. As shown in FIG. 1, the feature extraction module 110 may obtain training data from the training data store 102.

At block 206, the system executing the process 200 can perform feature extraction on the training data. Illustratively, the feature extraction module 110 may obtain a sentence of training data. For each word position in the input sentence, the feature extraction module 110 may generate a feature vector. The feature vector for a word position can be a set of data regarding the word at the word position, the context of the word position, and the like. For example, the feature vector may include the word itself (e.g., "current word= . . . "), the immediately preceding word (e.g., "previous word= . . . "), the immediately following word (e.g., "next word= . . . "), and any number of additional preceding or following words. In addition, the feature vector may include various gazetteer-based features. In named entity recognition, a "gazetteer" may be a list of words that correspond to a particular label. Presence of a particular word in a gazetteer for a particular label can be a strong indicator that the label is correct for the word. The feature extraction module 110 can query the various lists to determine whether the current word or any of the contextual words are present. The feature vector may then include values for the various gazetteers (e.g., "is in song title gazetteer=yes"). As shown in FIG. 1, the feature extraction module can provide the extracted feature vectors (or individual features) to the feature hashing module 112.

At block 208, the system executing the process 200 can perform feature hashing on some or all of the features extracted from the training data. Illustratively, the feature hashing module 112 can input individual features (e.g., "current word= . . . ") into a predefined hash function to obtain a hashed output. The output produced by the hash function may serve as the index to the model parameter values for the feature.

Conventional CRF models typically include an input dictionary or some other cross-reference list that associates model parameter indices (e.g., multi-byte numerical values) to the textual features (e.g., multi-byte strings including the feature name and extracted value, such as "current word= . . . "). A CRF model that includes a feature hashing function does not need an input dictionary to cross-reference features to parameter indices, because the hashed output serves as the indices. By replacing the input dictionary (or some portion thereof) with a feature hashing function, the size of the CRF model can be reduced substantially.

Hash functions can take, as input, a potentially unlimited set of possible input values and produce a predefined, limited set of possible output values. The feature hashing function used for a particular CRF model can be a hash function chosen such that number of possible output values is about the same as the number of model parameter indices in the trained model, or the number of model parameter indices expected to be in the trained model. Therefore, each possible hashed output value can correspond to a particular model parameter location.

Because hash functions produce a fixed set of output values for an unlimited set of possible inputs, the hash function may produce the same hashed output for two or more different features input into the hash function. This is known as a hash collision. In this scenario, the model parameter weights at the location corresponding to the hashed output will be used for each of the features for which the hashed output is produced. In some cases, the individual features that produce the same hashed output may be quite different, and may normally be associated with different parameter values. To reduce the effect of hash collisions on model accuracy, parameter weights for a given feature may be stored multiple times in the model (e.g., the same parameter weights may be stored at two or more different locations). In addition, multiple different hash functions may be used. Because the input dictionary has been replaced by the hash function, two or more copies of some or all parameter values may be included in the trained model, and the model may still require substantially less storage space than a conventional CRF model.

As an example, a feature for which weights are stored at two or more locations may be hashed by two or more different hash functions to obtain the indices for each of the two or more locations. Alternatively, the same hash function may be used on two or more different versions of the feature to produce the hashed output corresponding to the two or more different locations. In such implementations, the feature may be hashed a first time to obtain a first index, and then the feature may be altered and hashed a second time, using the same hash function, to obtain a second index (e.g., the feature "current word= . . . " may be hashed, and then an altered version may be generated by adding a counter to the end to produce "current word= . . . 1" which may be hashed by the same function to produce a different output).

At block 210, the system executing the process 200 can perform named entity recognition on the input sentence using feature vectors for the input sentence and weight vectors for states of the model. Illustratively, the feature vector for a given word position in the input sentence may be a set of parameter values for the word position, and each of the values may be obtained from a model location corresponding to the hashed output for a particular feature extracted from the input sentence for the word position. The weight vector for a given state may include a set of state-specific weights, each weight corresponding to a feature of the feature vectors generated above. The named entity recognition module 114 may generate results using a "forward-backward" algorithm. For example, the NER module 114 may multiply, for each word position in the input sentence, the values of the feature vector by the corresponding values of the weight vector for each possible state (each possible label that may be applied to the word position corresponding to the feature vector) and summing the resulting products for each possible label. The NER decoder module 114 may then select the highest-scoring sequence of input labels for the input sentence, and provide the selected sequence as named entity recognition results.

At block 212, the system executing the process 200 can update the model parameter values to improve the accuracy of the model and also to reduce the effect of features and parameters that have little effect on the accuracy of the model (e.g., the parameters which contribute little to the model's ability to discriminate between labels). Prior to training the model, or at the outset, the parameters of the model may have been initialized. In some embodiments, the parameters may be initialized to random values. During the training process, the parameter values may be incrementally adjusted—over the course of multiple iterations—toward the respective values that produce the best results for the training data. In addition, the parameters may be regularized. In some embodiments, regularization may involve calculating, by the regularization module 116, a value that indicates how well the results from the current iteration match the training data. Such a value may be calculated using an objective function (e.g., a function which produces output regarding how a particular objective is being met, such as how well the model parameters produce correct named entity labels for the training data). The regularization module can then derive a value from all of the current parameters of the model, such as by computing a norm for all of the current parameters of the model. A parameter adjustment value, such as a weighted sum of the objective function value and the model parameter norm, can then be computed (e.g., by multiplying the objective function value and/or the model parameter norm by one or more constants or other factors). The parameter adjustment value may then be used to determine how to modify the model parameters for the next iteration. For example, the model parameters may be modified in proportion to the magnitude of the parameter adjustment value, and in the direction of the parameter adjustment value (e.g., increased or decreased).

Regularizing parameter values helps to prevent "over-fitting." Over-fitting can occur when parameters for relatively unimportant features are given artificially high values due, at least in part, to the training data on which they were trained. Models with over-fit parameters can have trouble generalizing and producing accurate results for new data that differs from the training data. Regularization puts constraints on model parameters so that they are less prone to over-fitting. Certain types of regularization drive down weights of unimportant parameters to zero such that they can be eliminated from model. In some embodiments, the regularization module 116 can use elastic net regularization to update and regularize the model parameters. Elastic net regularization uses both L1 and L2 regularization. Illustratively, in L1 regularization, the absolute value of all model parameters can be used in calculating the norm described above. L1 regularization can drive the majority of the parameter weights to zero. The zero weights can then be removed from the model. However, L1 regularization may cause stability problems due to non-convex optimization. In L2 regularization, the sum of the squares of the model parameters can be used in calculating the norm described above. L2 regularization can help mitigate the stability problems associated with non-convex L1 optimization. Elastic net regularization uses both L1 and L2 norms.

Figure 3:
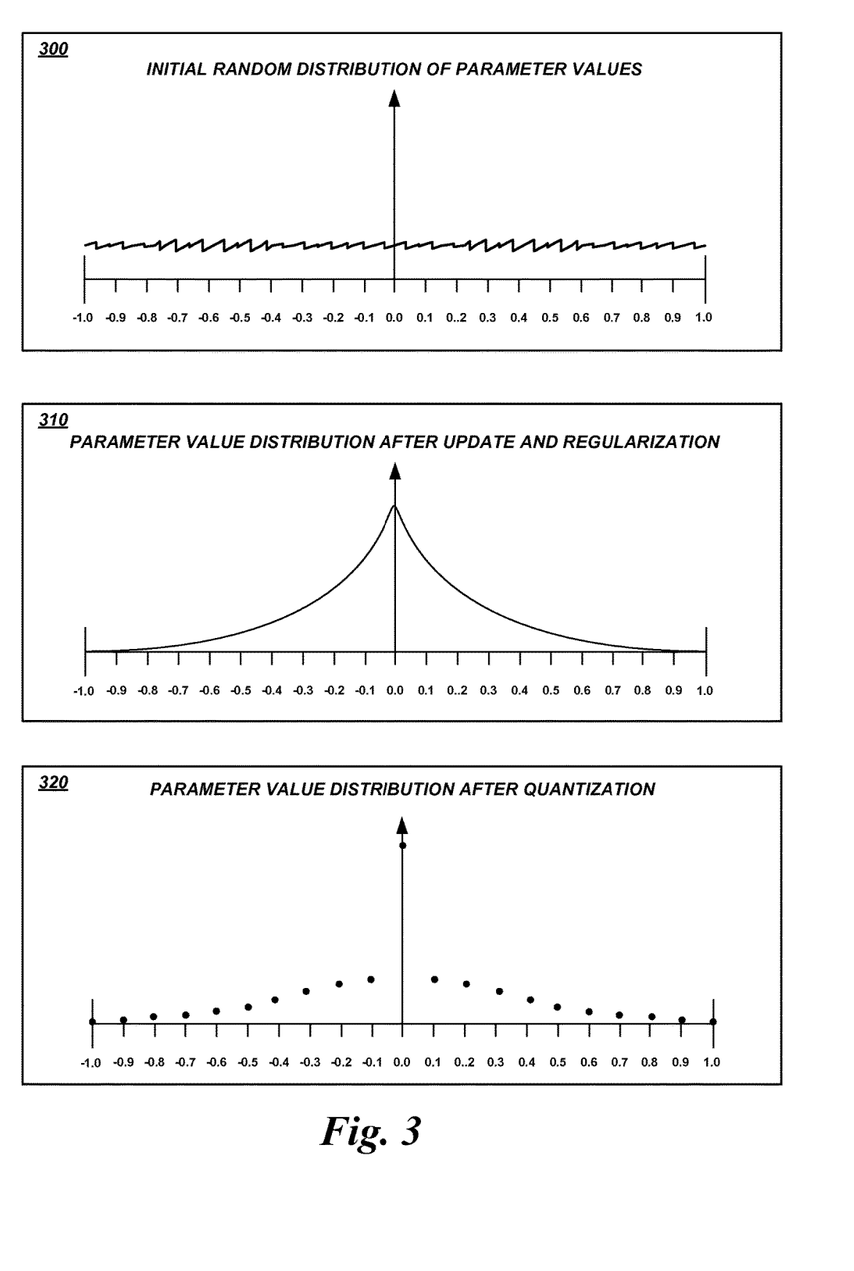
FIG. 3 is a diagram of conditional random field parameter values at various points during model training according to some embodiments.

FIG. 3 shows several graphs of model parameter value distributions at various states of the training process 200. The graphs 300, 310, and 320 shown in FIG. 3 each include a horizontal axis that corresponds to the range of values that the model parameters may take, and a vertical axis that corresponds to the number of model parameters that have taken each value. As shown in graph 300, the model parameter values may be randomly initialed at the outset of training, resulting in a relativity consistent distribution of values. After some number of training iterations and some amount of parameter adjustment and regularization, the distribution of model parameter values may be closer to the distribution shown in graph 310 than 300. As shown in graph 310, a large portion parameter values have been adjusted to be zero or close to zero.

Returning to FIG. 2, at decision block 214 the system executing the process 200 can determine whether to process more training data sentences. Illustratively, blocks 206 through 212 may be performed for each sentence of training data, for each subset of training data sentences, or for the entire set of training data, and the process 200 may return to block 206 as appropriate. In some embodiments, the entire set of training data may be processed multiple times before proceeding to block 216.

At block 216, the system executing the process 200 can reduce the numerical precision of the model parameter values to further reduce the size of the model. The distribution of parameter values in a CRF model typically follows a Zipfian (or power law) distribution centered on zero. The magnitude of values is indicative of the discriminative power of the respective features with which the values are associated. For example, values near the extreme positive or extreme negative end of the range of possible values are more discriminative (e.g., contribute more to the proper determination of an entity label) than values near zero, whether positive or negative.

The quantization module 118 can reduce the numerical precision of model parameter values using a uniform quantization process. One beneficial effect, among others, of such quantization is that additional values close to zero can be mapped to zero, thereby allowing additional values to be removed from the model. In addition, such a uniform quantization process preserves the relative precisions of parameter values because the larger values remain proportionately larger than the other values of the model. By quantizing parameter values such that a large number of relatively unimportant values are removed from the model while the magnitude of values for relatively important parameters remains high, the size of the model can be reduced.

In some embodiments, the parameter values can be quantized from 8-byte double precision values to 1-byte values. In general, the range of possible values in an 8-byte number is substantially larger than the range of possible values in a 1-byte number using the same precision. In addition, the precision in an 8-byte number is substantially greater than the precision in a 1-byte number using the same range of possible values.

Returning to FIG. 3, graph 320 shows the distribution of model parameter values after quantization. As described above, a uniform quantization may be used such that the range of available values is separated into equal portions, and the same output value is assigned to all input values in a given portion. This quantization can preserve the relative differences between the parameter values, while allowing a large number of relatively unimportant parameters to be set to zero and removed from the model.

At block 218, the system executing the process 200 can store and/or distribute the model. For example, the model may be stored in a central repository such that it can be accessed by multiple individual server devices as needed to perform named entity recognition. Alternatively or in addition, the model may be distributed to one or more devices such that the model is available on the devices when named entity recognition is next performed.

Figure 4:
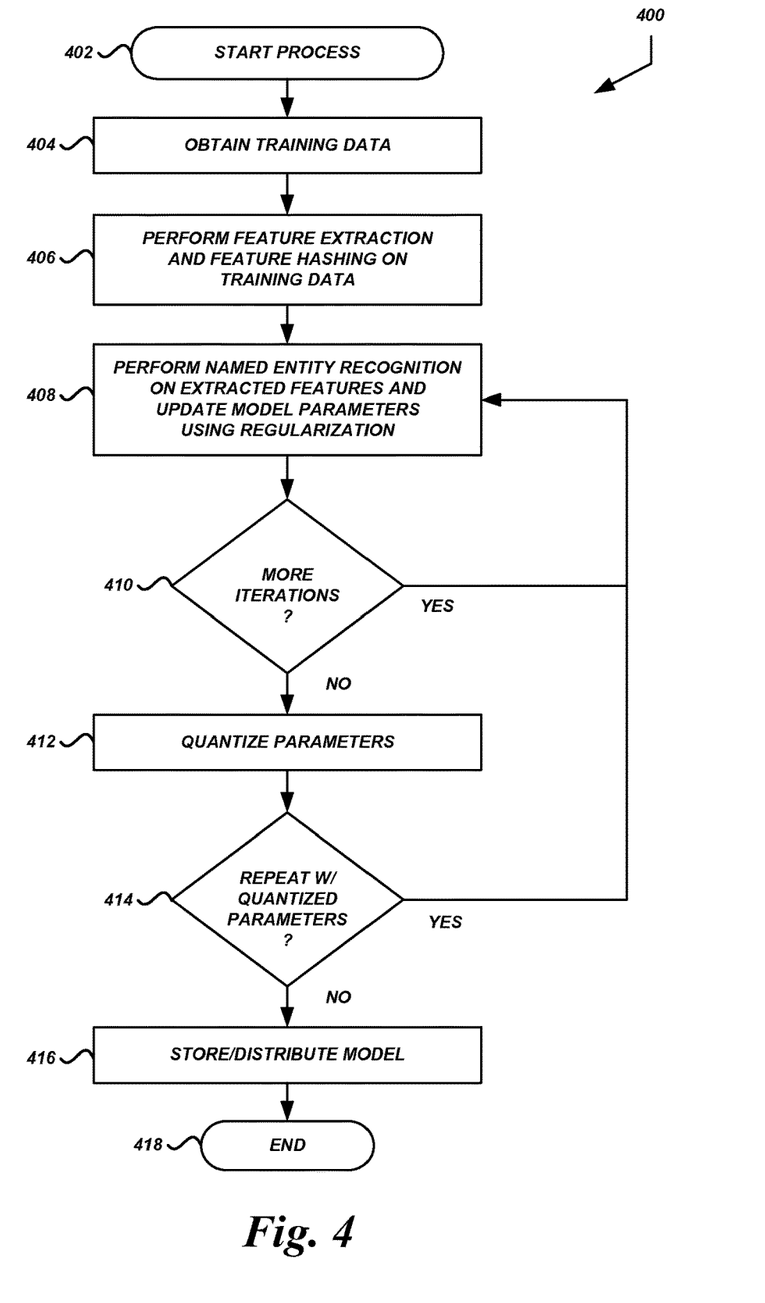
FIG. 4 is a flow diagram of another illustrative process for training conditional random field models according to some embodiments.

FIG. 4 illustrates another example process for training CRF models. Advantageously, the process 400 shown in FIG. 4 may be performed in an iterative fashion such that the quantized parameter values may trained, rather than quantizing trained parameter values at the end of training as described above with respect to FIG. 2.

The process 400 shown in FIG. 4 begins at block 402. The process 400 may be embodied in a set of executable program instructions stored on a computer-readable medium, such as a persistent storage component of a server computing device of the model training system 100. When the process 400 is initiated, the executable program instructions can be loaded into computer-readable memory, such as RAM, and executed by one or more computer processors of the server computing device. In some embodiments, multiple computer processors or server computing devices may execute portions of the process 400 serially or in parallel.

At block 404, the system executing the process 400 can obtain training data. Illustratively, the feature extraction module 110 may obtain or gain access to an entire set of training data.

At block 406, the system executing the process 400 can perform feature extraction, feature hashing, as described above, on the entire training data set.

At block 408, the system executing the process 400 can perform named entity recognition on the extracted features using the current model parameters, and then update the model parameters using regularization as described in detail above.

At decision block 410, the system executing the process 400 can determine whether to perform another iteration of NER and model parameter update and regularization on the training data. Illustratively, the system may perform some predetermined number of iterations (e.g., about 50 or about 100) before proceeding to block 412.

At block 412, the system executing the process 400 can quantize the current model parameters, as described in detail above. The quantized parameter values may be stored using the same data type in which they will be stored in trained model (e.g., a 1-byte numerical data type, rather than an 8-byte number data type into which they were initially generated). In some embodiments, the parameter values may be quantized such that they can be stored in the final (smaller) data type, but may then be stored in a larger data type to continue the training process and allow smaller incremental adjustments than would be possible using the smaller data type.

At decision block 414, the system executing the process 400 can determine whether to repeat the training process shown in blocks 408 and 410 using the quantized parameters. In some embodiments, the training process may be repeated with the quantized parameters a predetermined number of times, or until the occurrence of some other event (e.g., the convergence of model parameter values).

At block 416, the system executing the process can store or distribute the model, as described above. In some embodiments, the model may be compressed further using losses methods (e.g., gzip or bzip) to produce an even smaller footprint for more efficient storage and/or transmission.

Sample Speech Processing System

Figure 5:
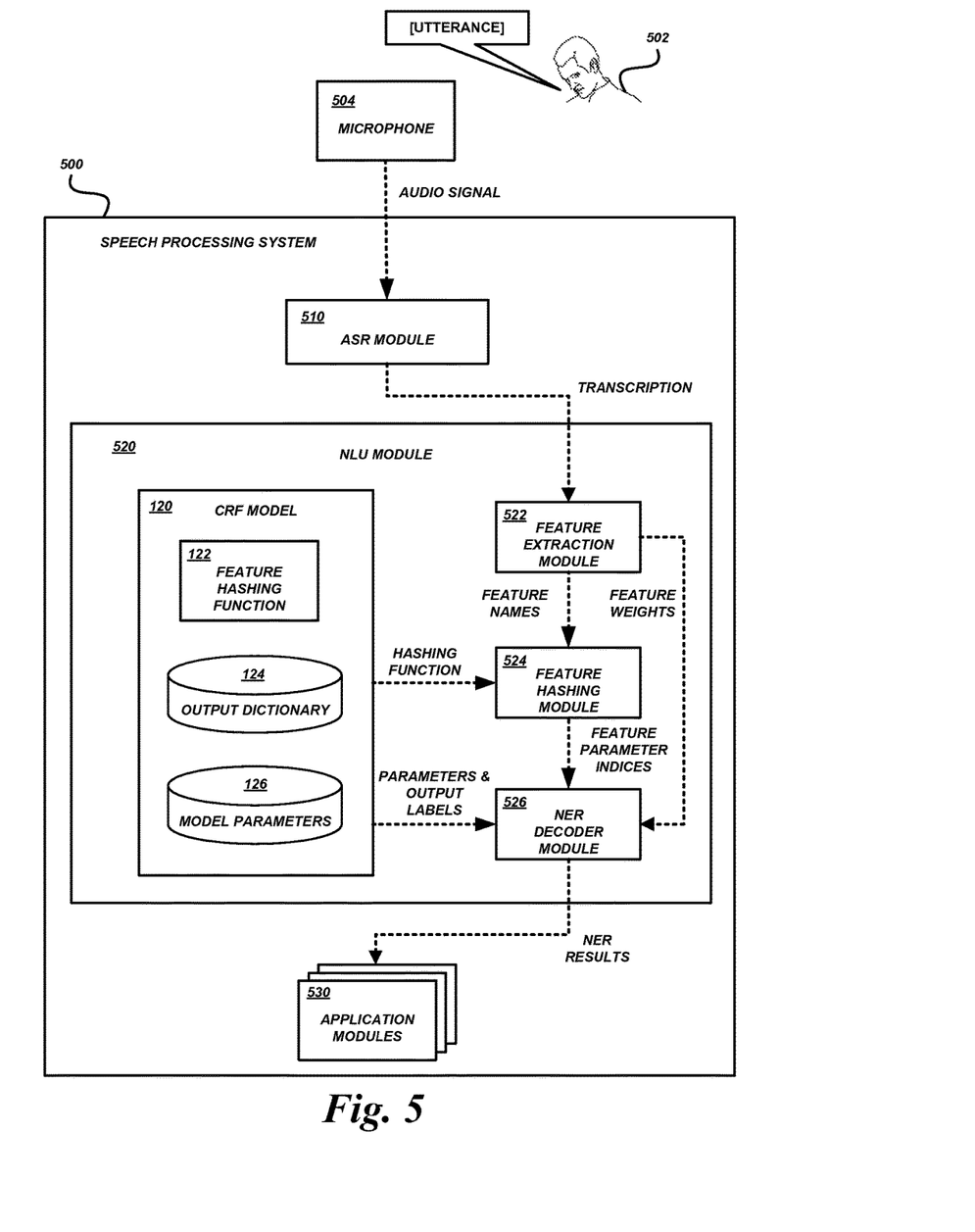
FIG. 5 is a block diagram of an illustrative computing system configured to use conditional random field models trained according to some embodiments.

FIG. 5 depicts a speech processing system 500 configured to use a CRF model trained using the techniques described above. The speech processing system 500 may be coupled to or integrated with a microphone 504. For example, the speech processing system 500 features described herein may be provided by a computing device (such as any of the computing devices described below), a personal computing device, mobile computing device, wearable computing device, consumer computing device, etc. In some embodiments, the speech processing system 500 may be a single server computing device, or it may include multiple distinct server computing devices, logically or physically grouped together to collectively operate as a speech processing system 500. The modules and components of the speech processing system 500 can each be implemented as hardware or as a combination of hardware and software. In such cases, the audio signal (or data derived therefrom) may be transmitted to the speech processing system 500 via a network.

As shown, the speech processing system 500 may receive an audio signal generated by a microphone 504 (or multiple microphones). The microphone 504 may be a stand-alone microphone in communication with the speech processing system 500. In some embodiments, the microphone 504 may be coupled to or integrated with a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

The speech processing system 500 can process the audio signal and perform various computing tasks using an ASR module 510, a natural language understanding ("NLU") module 520, various application modules 530, and the like. For example, the audio signal may include audio of an utterance made by a user 502, and the speech processing system 500 may use the ASR module 510 to generate a transcription of the utterance. The speech processing system 500 may then use the NLU module 520 to determine the user's intent and select an action to take in response to the utterance. The speech processing system 500 may then use an application module 530 to carry out the selected action. The example modules and components shown in FIG. 5 are illustrative only, and are not intended to be limiting. In some embodiments, the speech processing system 500 may include additional, fewer, and/or alternative modules or components.

In one non-limiting example, the NLU module 520 may use a feature extraction module 522 to extract features from a text, such as the transcription received from the ASR module 510. A feature hashing module 524 may then hash the features, using a feature hashing function 122 of a CRF model 120 (e.g., as discussed above), to obtain model parameter indices for the features. A named entity recognition decoder module 526 may use the parameter indices to obtain parameter values from the CRF model 120 for the features, and may perform named entity recognition on the features using, e.g., a Viterbi algorithm. The named entity recognition decoder module 526 may then provide the results as output to another module or process, such as an application module 530 that performs some action using the label information generated by the named entity recognition decoder module 526. For example, an application module 530 may play music to a user based on "song title" entities recognized in an utterance made by the user.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of one or more computing devices configured with specific computer-executable instructions,
obtaining training data comprising a sentence and a correct named entity label for a word of the sentence, the correct named entity label indicating a category of the word;

generating feature data representing one or more features of the word in the sentence of the training data;

determining a first model parameter index based at least partly on a first hashed value of a feature represented by the feature data, wherein the first model parameter index comprises an index of a first model parameter of a plurality of parameters of a conditional random field model, and wherein the first model parameter corresponds to the feature represented by the feature data;

determining a second model parameter index based at least partly on a second hashed value of the feature represented by the feature data, wherein the second model parameter index comprises an index of a second model parameter of the plurality of parameters, and wherein the second model parameter corresponds to the feature represented by the feature data;

computing, for a candidate named entity label of a plurality of named entity labels:
  a first product of the first model parameter and a first weight associated with the candidate named entity label; and
  a second product of the second model parameter and a second weight associated with the candidate named entity label;

selecting the candidate label for the word from the plurality of named entity labels based at least partly on a sum of the first product and the second product;

determining that the candidate label is incorrect for the word by comparing the candidate label to the correct named entity label;

computing a normalized parameter value using values of the plurality of parameters;

computing a parameter adjustment value using the normalized parameter value, the first product, and the second product;

reducing a value of the model parameter based at least partly on the parameter adjustment value;

quantizing values of the plurality of parameters of the conditional random field model to generate quantized values of the plurality of parameters, wherein the quantized value of the model parameter is zero; and storing an updated version of the conditional random field model using the quantized parameters of the plurality of parameters, wherein the updated version of the conditional random field model excludes the quantized value for the model parameter, and wherein storage of the updated version of the conditional random field model consumes fewer resources than storage of the conditional random field model.

2. The computer-implemented method of claim 1, wherein generating the feature data comprises generating a string comprising an adjacent word in the sentence, the adjacent word immediately preceding or following the word in the sentence, and wherein determining the first model parameter index comprises using a hashing function to hash the string.

3. The computer-implemented method of claim 1, wherein the conditional random field model comprises a list associating features with model parameter indices, and wherein the updated version of the conditional random field model comprises a hash function in place of the list associating features with model parameter indices.

4. The computer-implemented method of claim 1, wherein generating the feature data comprises generating data representing the feature, the feature comprising one of: the word; a word preceding the word in the sentence; a word following the word in the sentence; or a value indicating one of a presence or absence of the word in a list of words associated with the candidate named entity label.

5. A system comprising:
  a computer-readable memory storing executable instructions; and
  one or more processors in communication with the computer-readable memory, wherein the one or more processors are programmed by the executable instructions to at least:
    obtain a set of model parameters of a first version of a conditional random field model, wherein each model parameter of the set of model parameters is associated with an index;
    determine, for each word of a training data sentence:
      a first index, of a first model parameter of the set of model parameters, based at least partly on a first hashed value of data regarding a feature of the word, wherein the first model parameter corresponds to the feature of the word;
      a first product of the first model parameter and a weight associated with a named entity label;
      a second index, of a second model parameter of the set of model parameters, based at least partly on a second hashed value of data regarding the feature of the word, wherein the second model parameter corresponds to the feature represented by the feature data; and
      a second product of the second model parameter and a weight associated with the named entity label;
    compute a parameter adjustment value based at least partly on whether the set of model parameters produces correct named entity labels for words of the training data sentence, wherein the parameter adjustment value is computed using the first product and the second product determined for at least one word of the training data sentence;
    adjust values of individual model parameters of the set of model parameters based at least partly on the parameter adjustment value to generate adjusted values;
    reduce numerical precision of the adjusted values to generate quantized values;
    generate a second version of the conditional random field model comprising an updated set of model parameters based at least partly on the quantized values, wherein model parameters with quantized values equal to zero are excluded from the updated set of model parameters; and
    store the second version of the conditional random field model, wherein storage of the second version of the conditional random field model consumes fewer resources than storage of the first version of the conditional random field model.

6. The system of claim 5, wherein the one or more processors are programmed by the executable instructions to compute the parameter adjustment value using elastic net regularization by computing a weighted sum of an objective function value and a value derived from the model parameters.

7. The system of claim 6, wherein the one or more processors are programmed by the executable instructions to compute the objective function value based at least partly on whether the set of model parameters produces correct named entity labels for words of the training data sentence.

8. The system of claim 6, wherein the one or more processors are programmed by the executable instructions to compute the value derived from the model parameters using absolute values of the model parameters.

9. The system of claim 6, wherein the one or more processors are programmed by the executable instructions to compute the value derived from the model parameters using a sum of squares of values of the model parameters.

10. The system of claim 5, wherein the one or more processors are programmed by the executable instructions to reduce the numerical precision of individual model parameter values equally using uniform quantization.

11. The system of claim 5, wherein the one or more processors are further programmed by the executable instructions to:
evaluate model output, associated with a named entity label for a word of the training data sentence, in comparison with expected model output associated with a correct named entity label for the word of the training data sentence; and
compute a metric value representing a degree to which the set of model parameters produces correct named entity labels for words of a plurality of training data sentences, wherein the metric value is computed based at least partly on results of evaluating the model output in comparison with the expected model output.

12. The system of claim 11, wherein the executable instructions to compute the parameter adjustment value comprise executable instructions to compute a product using a normalized parameter value and the metric value.

13. The system of claim 5, wherein the one or more processors are further programmed by the executable instructions to at least:
compute the first hashed value using a first hash function and the data regarding the feature of the word; and
compute the second hashed value using a second hash function and the data regarding the feature of the word, wherein the second hash function is different than the first hash function.

14. The system of claim 5, wherein the one or more processors are further programmed by the executable instructions to at least:
compute the first hashed value using a hash function and the data regarding the feature of the word;
generate an alternate version of the data regarding the feature of the word; and
compute the second hashed value using the hash function and the alternate version of the data regarding the feature of the word.

15. The system of claim 5, wherein the feature of the word comprises one of: the word; a word preceding the word; a word following the word; or a value indicating a presence or absence of the word in a list of words associated with a particular named entity label.

16. A computer-implemented method comprising:
as performed by a computing system comprising one or more computing devices configured with computer-executable instructions,
obtaining a set of model parameters of a first conditional random field model, wherein each model parameter of the set of model parameters is associated with an index;
determining, for each word of a training data sentence:
a first index, of a first model parameter of the set of model parameters, based at least partly on a first hashed value of data regarding a feature of the word, wherein the first model parameter corresponds to the feature of the word;
a first product of the first model parameter and a value associated with a named entity label;
a second index, of a second model parameter of the set of model parameters, based at least partly on a second hashed value of data regarding the feature of the word, wherein the second model parameter corresponds to the feature represented by the feature data; and
a second product of the second model parameter and a value associated with the named entity label;
computing a parameter adjustment value using the first product and the second product determined for each word of the training data sentence;
adjusting values of individual model parameters of the set of model parameters based at least partly on the parameter adjustment value to generate adjusted values;
reducing numerical precision of the adjusted values to generate quantized values;
generating a second conditional random field model comprising an updated set of model parameters based at least partly on the quantized values, wherein model parameters with quantized values equal to zero are excluded from the updated set of model parameters; and
storing the second conditional random field model, wherein storage of the second conditional random field model consumes fewer resources than storage of the first conditional random field model.

17. The computer-implemented method of claim 16, wherein the process further comprises computing an objective function value based at least partly on whether the set of model parameters produces correct named entity labels for words of the training data sentence.

18. The computer-implemented method of claim 17, wherein computing the parameter adjustment value comprises using the objective function value and absolute values of the model parameters.

* * * * *